United States Patent [19]

Petrini et al.

[11] 4,139,764
[45] Feb. 13, 1979

[54] EVENT MONITOR FOR COURT GAMES

[76] Inventors: Julian L. Petrini; Madeline A. Petrini, both of 3748 Meru La., Santa Barbara, Calif. 93105; Richard A. Giacomotti; Sally A. Giacomotti, both of 542 Calle Mastil, Santa Barbara, Calif. 93111; Ted L. Slater, 1491 Sycamore Canyon Rd., Santa Barbara, Calif. 93108

[21] Appl. No.: 779,610

[22] Filed: Mar. 21, 1977

[51] Int. Cl.² .............................................. G07C 1/28
[52] U.S. Cl. ............................. 235/92 GA; 58/145 D; 194/4 R; 235/92 T; 235/92 R; 340/323 R
[58] Field of Search .......... 235/92 GA, 92 AC, 92 T, 235/92 PD, 92 CT, 61.7 B, 61.12 N; 58/145 D, 152 B, 38 R, 57.5 B; 340/149 A, 149 R, 323 R; 194/DIG. 23, DIG. 22, DIG. 11, 18, 4 R, 9 T; 272/3

[56] References Cited

U.S. PATENT DOCUMENTS

| | | | |
|---|---|---|---|
| 3,448,459 | 6/1969 | Margolis | 235/92 GA |
| 3,632,995 | 1/1972 | Wilson | 235/61.12 N |
| 3,645,370 | 2/1972 | Rodwell et al. | 194/9 T |
| 3,780,844 | 12/1973 | Bali | 194/4 R |
| 3,834,153 | 9/1974 | Yoda et al. | 58/57.5 |
| 3,877,216 | 4/1975 | Mounce et al. | 235/92 T |
| 3,933,231 | 1/1976 | Vinet | 194/DIG. 18 |
| 3,944,039 | 3/1976 | Houghtaling | 194/4 R |
| 3,959,607 | 5/1976 | Vargo | 340/149 A |
| 3,959,632 | 5/1976 | Trehn et al. | 235/92 AC |
| 3,988,570 | 10/1976 | Murphy et al. | 235/61.7 R |

Primary Examiner—Joseph M. Thesz
Attorney, Agent, or Firm—Spensley, Horn, Jubas & Lubitz

[57] ABSTRACT

A method and system for monitoring court games is described in which a counter is actuated by a card bearing a pre-determined code. Upon being actuated, the counter is pre-set to a pre-determined period of play for a game in a court with which the monitor is associated. The counter then counts the elapsed period of play and displays to other players waiting to use the court the period of play still remaining, confirming to them in a positive fashion the period they must wait to use the court. Upon expiration of the pre-determined period of play, the event monitor signals this condition permitting the other players to actuate the system and commence their use of the court.

12 Claims, 7 Drawing Figures

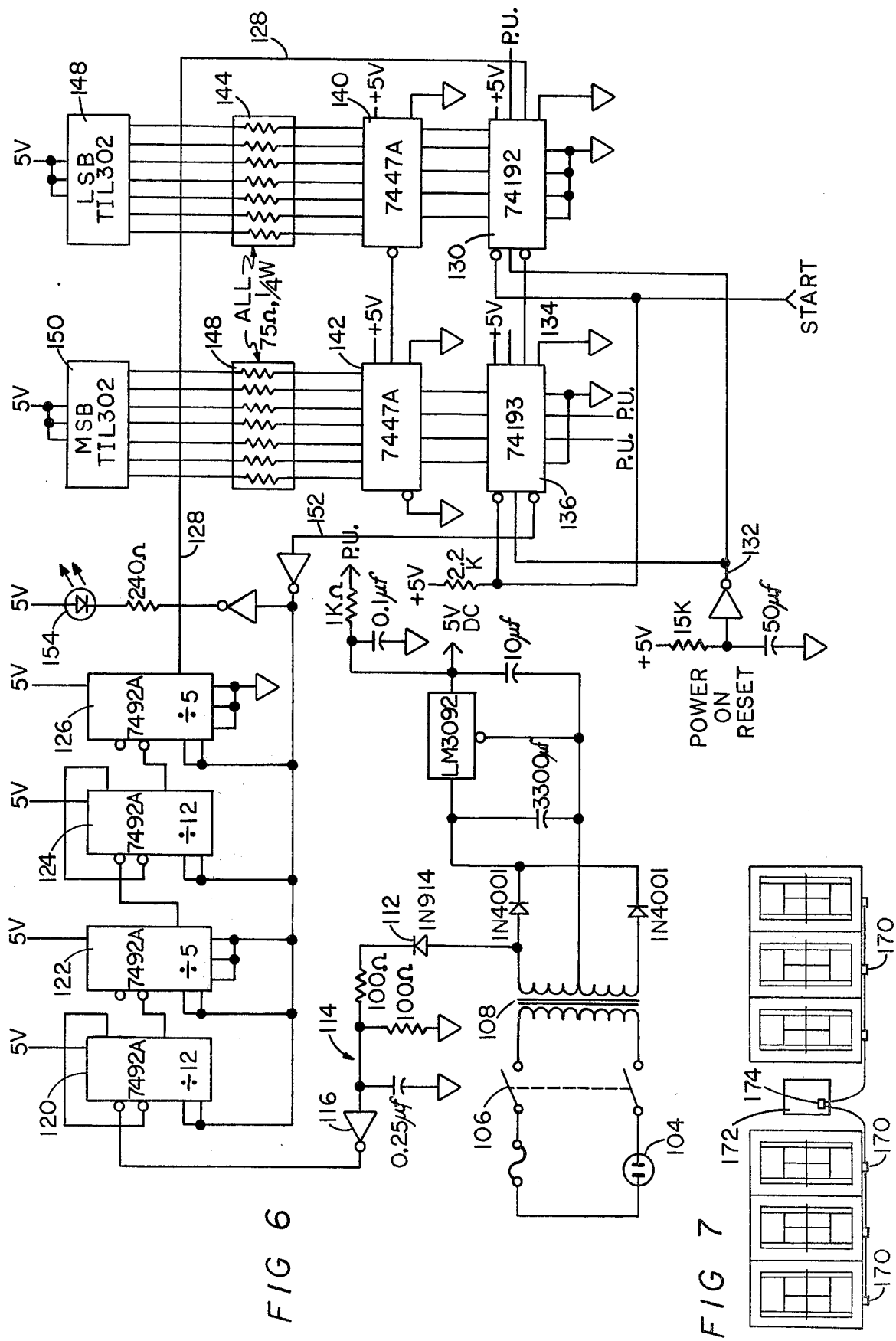

EVENT MONITOR FOR COURT GAMES

BACKGROUND OF THE INVENTION

The inventions relates to an event monitor for court games, especially one which incorporates a self-regulating feature to permit unattended use of a court, or set of courts.

With the increasing popularity of court games, such as tennis, regulating usage of the courts presents an increasing problem. Typically a pre-determined period is provided for the use of the court by each player, or group of players. However, since no truly satisfactory way exists to monitor the expired period of usage by players already on the court, subsequent players must depend upon their integrity in determining the extent of time still left to players already on the court. Also, since such courts are expensive to construct and maintain, it is desirable to recoup at least some of this cost by charging the players using the court for such usage. While it is possible both to monitor the period of usage and charge for such usage by providing an attendant for the court, or group of courts, this approach only adds to the cost and seldom is used.

It is quite desirable, for these reasons, to achieve a system that will automatically monitor the period of usage of the court by one group of players and signal to other, waiting players the amount of time left to the players on the court. Also, it is desirable to incorporate in such a system provisions requiring players using the court to pay for such usage. These and other objects of the invention will be apparent from the following description of a preferred embodiment.

BRIEF DESCRIPTION OF THE INVENTION

A method and system for monitoring court games is described in which a counter is actuated by a card bearing a pre-determined code. Upon being actuated, the counter is pre-set to a pre-determined period of play for a game in a court with which the monitor is associated. The counter then counts the elapsed period of play and displays to other players waiting to use the court the period of play still remaining, confirming to them in a positive fashion the period they must wait to use the court. Upon expiration of the pre-determined period of play, the event monitor signals this condition permitting the other players to actuate the system and commence their use of the court. Preferably the event monitor first reads the code on the card used to actuate it, compares this read code with a pre-determined code, and actuates the system only when the read and pre-determined codes coincide. Also, preferably the event monitor mutilates the card upon its being used in the system, regardless of whether or not it was successful in actuating the system, this mutilation destroying false cards and preventing repeated use of correct cards.

The actuating circuit for the event monitor preferably includes sensor means for generating a multiplicity of simultaneous series of of electric pulses as the card is employed to actuate the system. Code counter means are advanced in their count upon each occurrence of a pre-determined coincidence between the corresponding pulses of the series. The actuating means also includes, preferably, a plurality of bi-stable circuits which are loaded with the count of the code counter upon a pre-determined coincidence of corresponding pulses of the series. Means are also provided to read the condition of the loaded bi-stable circuits and to actuate the counter of the event monitor only when the bi-stable circuits are loaded with a pre-determined condition. The actuating means further may include means to produce a strobe pulse upon the occurrence of a pre-determined coincidence of the corresponding pulses of the generated series, means to detect the count of the code counter upon the occurrence of a strobe pulse and to disable the reading means if the count of the code counter then exceeds a pre-determined count, thereby to provide added assurance that the event monitor will be actuated only by a card bearing a proper, pre-determined code.

BRIEF DESCRIPTION OF THE DRAWINGS

The invention will be further described in connection with the accompanying drawings in which:

FIG. 6 is an electrical schematic of the counter circuit for signaling the unexpired period of play; and FIG. 7 is a plan view of a series of courts including an event monitor system.

DETAILED DESCRIPTION OF THE INVENTION

While a preferred embodiment of the invention will be described, there are certain general principles employed in the event monitor which easily can be missed if only the construction of the preferred system is considered. A basic principle of the event monitor herein described is that it is self-monitoring, or self-regulating. Not only are players waiting for the court presented with the time left to play for players already on the court, but they are also told by the event monitor that the players on the court still have time left to play. In other words, if players have entered the court without actuating the event monitor, subsequent players can actuate the event monitor and assume control of the court at that moment. If players have properly actuated the event monitor, subsequent players are told by the event monitor the time left for the players already on the court. The subsequent players then serve to monitor the usage of the players on the court and to terminate that usage upon expiration of the period.

The event monitor employs a card which must be used to actuate the monitor. This card incorporates certain code features that cooperate with the event monitor to provide a significant impediment to counterfeiting the card to prevent improper actuation of the monitor. It is contemplated that, while these cards may be distributed free of charge, in the normal system they will be purchased by the players and automatically mutilated upon being used to actuate the event monitor, this mutilation preventing their subsequent use to again actuate an event monitor. In short, the event monitor system is designed to provide a self-regulating feature subsequent players ejecting players already on the court when their period of use has expired, the system also permitting revenue to be realized by sale of the cards required to actuate the monitor, this revenue at least in part deferring the cost of maintaining the court. All of these features combine to provide a truly practical approach to fair and profitable court operation. It is expected to provide significant incentive to the construction of sufficient courts to meet the increasing demand.

Figure 1:
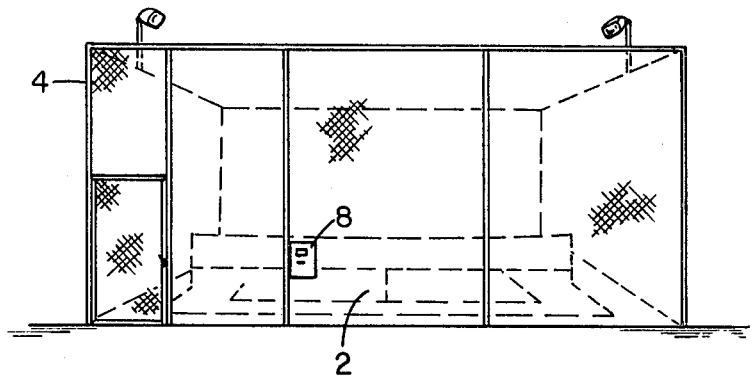
FIG. 1 is a perspective view of a court bearing an event monitor.
Figure 2:
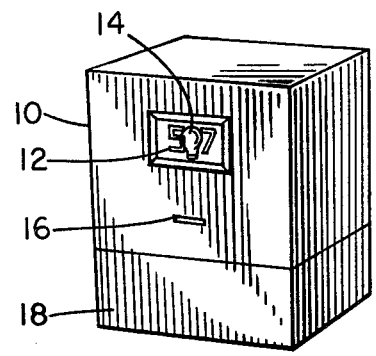
FIG. 2 is a perspective view of an event monitor.

Turning now to the preferred event monitor, illustrated in FIG. 1 is a court 2 surrounded by fencing 4 bearing lights 6 and an event monitor 8. The event monitor preferably is physically attached to one of the upright supports of the fencing on the outside of the fencing and is electrically powered by a cable passing to it through this support to impede vandalism. This location requires players to actuate the monitor prior to entering the court. As shown in FIG. 2, the event monitor includes a display 12 that presents the period of time left for usage of the court by players already on it. The event monitor also includes a light 14 for signalling expiration of the period of play and the fact that the court is open for usage by other players, whether or not players still are on the court. The housing also includes a slot 16 in which a card designed to actuate the monitor may be deposited, the card passing through the housing to a lower receptacle portion 18, which portion periodically may be opened and emptied of cards.

Figure 3:
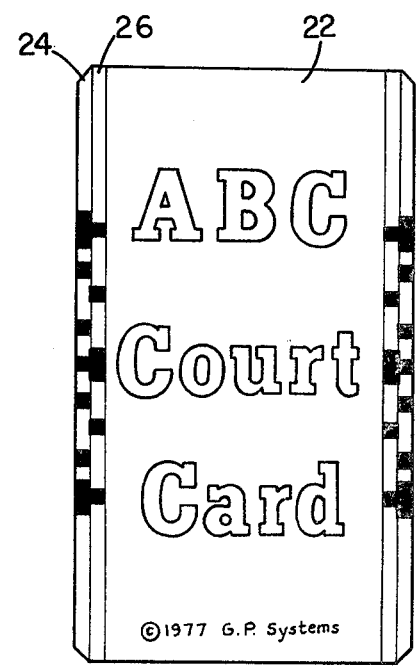
FIG. 3 is a front view of a card employed to actuate the event monitor.

A typical card designed to actuate the system is illustrated in FIG. 3. It bears in two tracks 24 and 26 along both longitudinal edges of the card certain indicia designed to actuate the event monitor. In one embodiment, the card may be either translucent or opaque, and the tracks bear indicia that are either opaque or transparent, respectively, these indicia being read by a sensor incorporated with the event monitor to actuate a counter that resets the event monitor to a pre-determined period of time, such as 60 minutes. Preferably the indicia borne by the two tracks along each longitudinal edge of the card are symmetrical about a center point of the card, permitting the card to be inserted into the event monitor in any orientation and still actuate the system if the code it bears corresponds to a pre-determined code.

Figure 4:
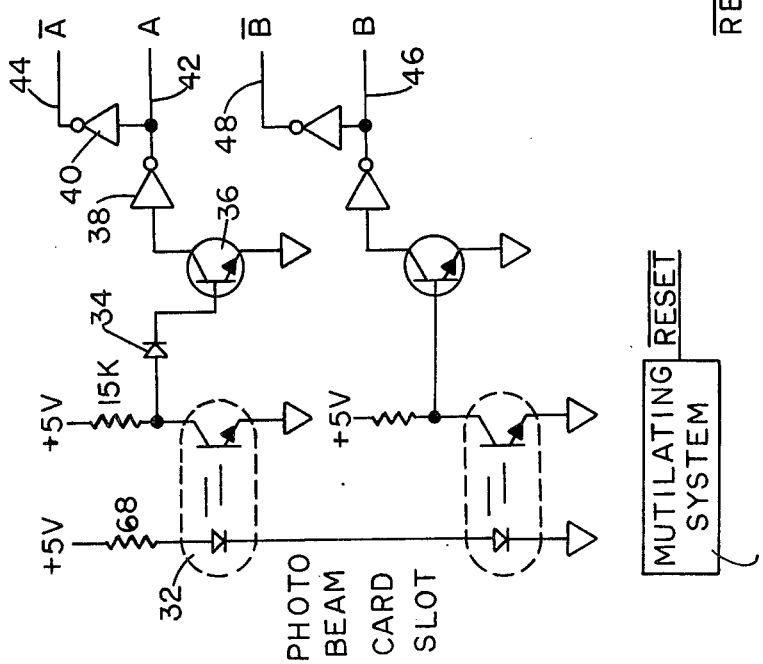
FIG. 4 is an electrical schematic of the circuit for reading the card employed to actuate the event monitor.

A circuit for reading the card and producing two simultaneous series of electric pulses corresponding to the indicia on the card is illustrated in FIG. 4. This circuit includes two photoelectric sensors 32, each sensor incorporating a light-emitting diode, the light of which is directed to a photosensitive semiconductive element. These sensors are powered from a source of electric power, the circuit for which is illustrated in FIG. 6 and will be subsequently described. The sensors are oriented in the channel through the event monitor underlying slot 16 so that, as the card passes through the slot, one sensor will illuminate track 24 and the other sensor track 26. As the transparent and opaque portions of these two tracks pass by the sensors, the sensors each will produce a series of electric pulses, the pulses for each sensor being received by diode 34, amplified by transistor 36, and inverted by elements 38 and 40. At outputs 42 and 44 will be present two trains of electric pulses, one train being the inverse of the other. The output 42 train of pulses is designated pulse train "A", and the output 44 train of pulses is designated "$\overline{A}$". In a similar fashion, the second photosensor produces two trains of pulses on outputs 46 and 48, one being the inverse of the other, output 46 being designated train "B" and output 48 train "$\overline{B}$". These output trains of pulses are applied at various points in the circuit illustrated in FIG. 5 as indicated by the various designations.

Early in the transit of the card through the photodetector circuit illustrated in FIG. 4, the code patterns are designed such that output A will be in its more positive state, and output $\overline{B}$ also initially in its more positive state but then, while A is still high $\overline{B}$ will drop to its low, or less positive state. Upon this event occurring, the reset circuit 52 shown in FIG. 5 drops to a low condition. This output is applied at various indicated points in FIGS. 5 and 6, resetting these various bi-stable circuits to a pre-determined condition. As subsequent opaque and transparent areas are sensed by the circuit illustrated in FIG. 4, the output pulse trains provided by this circuit will change in a corresponding fashion. Outputs A and $\overline{B}$ are applied to counter-circuit elements 54 and 56 shown in FIG. 5, causing this counter to advance from its reset, 0 condition, one unit each time A drops from a high to a low state, while $\overline{B}$ remains high. The output of this counter on lead 58 is applied to count load gates 60 and 62. Also applied to these load gates are outputs 64 and 66 of counter stage 54. Upon occurrence of A and B, applied to a load gate 70, it produces an output which is inverted by element 72 and applied to count load gates 60 and 62. This load command causes the count conditions on lines 58, 64, and 66 to be applied to count latch bi-stable elements 74, 76, 78, and 80, which elements are set to a condition determined by the counts in counter elements 54 and 56.

Figure 5:
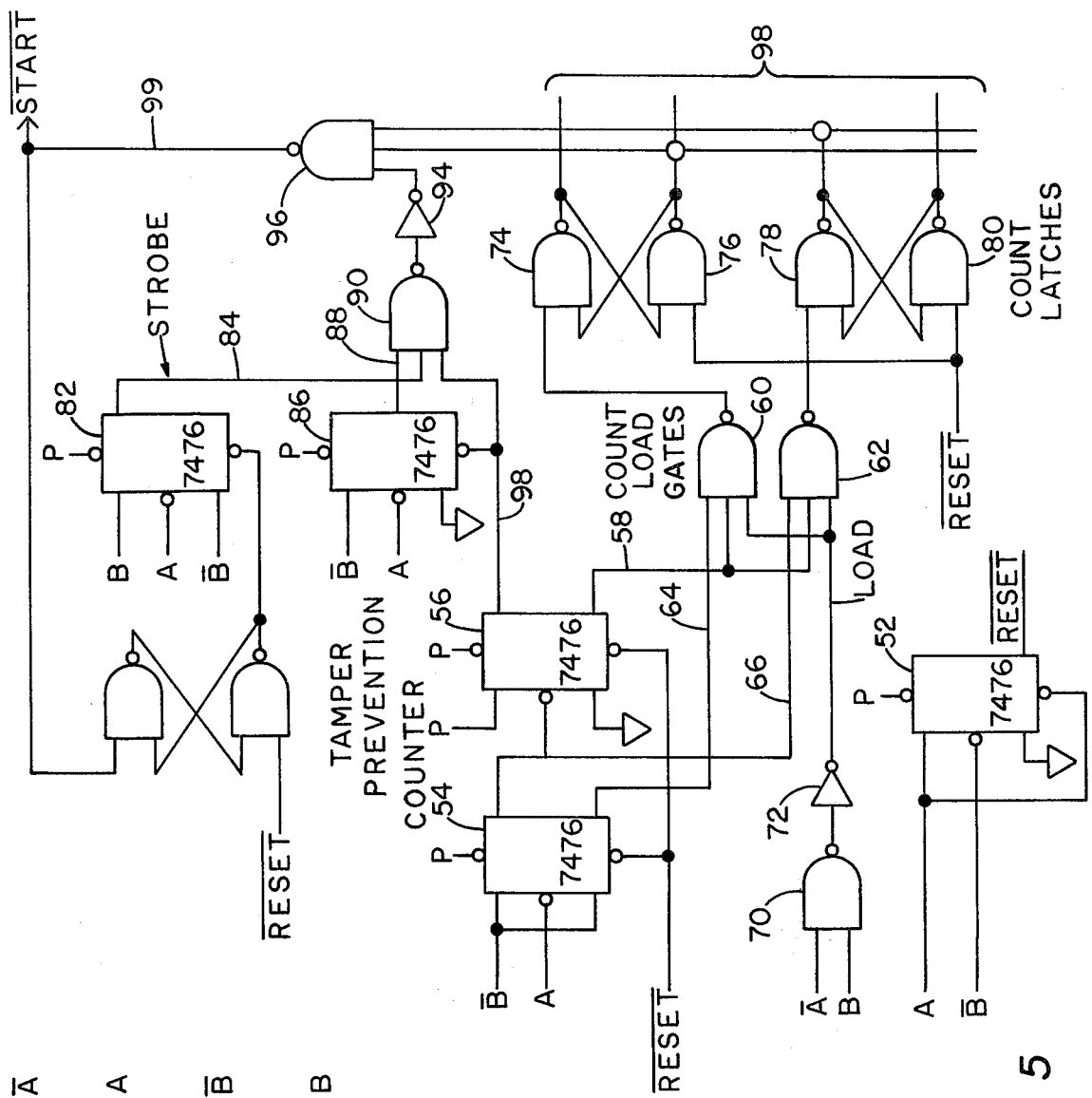
FIG. 5 is an electrical schematic of the circuit comparing the code borne by the read card with a pre-determined code.

A circuit also is provided in FIG. 5 that is designed to prevent erroneous actuation of the event monitor such as might be obtained by a random jiggling of a card partially placed in slot 16. This circuit includes element 82 which upon occurrence of the indicated signals will produce a strobe pulse on output line 84. The circuit also includes an element 86 which upon occurrence of the indicated signals will produce an output on line 88. The outputs on lines 84 and 88 are applied to element 90 together with an output of the counter element 56 applied on line 92. If the output of the counter exceeds a pre-determined count, this condition will be indicated by the output on line 92 which is applied through element 90 upon occurrence of the strobe pulse to inverter 94 and through it to start command element 96. Also applied to the start command element are the output of the count latch elements as determined by matrix 98. As shown, this matrix is wired for a binary "two" output of the counter captured in the count latch elements upon occurrence of the load signal produced by element 70. If this count has been captured in the count latch elements and if the counter has not advanced beyond a binary count of four upon occurrence of the strobe signal on line 84, all of the signals applied to start command element 96 will be positive producing a start command signal on line 99. In this manner the system determines the presence of a valid card and then produces a "start" command.

The start command signal is applied to the counter illustrated in FIG. 6 on line 99. As illustrated, this circuit includes a power supply 102 producing a positive 5-volt DC output and another, modified power output "P". To the power supply is applied a 60-cycle 117-volt AC source of power 104 through a control switch 106 and a transformer 108. As previously noted, this source of power may be tapped from the power line for lights 6 on the court and led along the court fence posts to the event monitor, preferably being protected as by being encased in the supports to prevent disruption of power by vandalism. A 60-cycle signal is tapped from this source of power, rectified by element 112 and applied through a filter circuit 114 and a Schmidt trigger inverter element 116 to an input of counter 120. Counter 120 divides this 60-cycle signal by 12 and applies the output of counter 122 which divides it by five. The output of counter 122 is applied to counter 124 which divides that output again by 12 and applies it to counter 126, a divide by five circuit. Thus, the output of counter 126 on line 128 is the pulse rate applied to counter 120 divided by a total of 3,600. In other words, the output of counter 126 appearing on line 128 is one cycle per minute, this pulse being high for approximately 12 seconds and then low for the rest of the period.

This output of the counter section is applied to the display section, specifically to element 130, a divide by 10 circuit. Initially, this element is reset by the reset command on line 132 to a "0" condition. Each time a pulse is applied to element 130 over line 128, it counts down from 0, cycling to 9, then 8, etc., until it returns to 0. An output of element 130 is applied on line 134 to element 136, also a count-down circuit that is reset to a count of 6 upon occurrence of the reset command. Accordingly, elements 136 and 130 together indicate a count of 60 which is counted down to 0, one count per minute, by the pulses applied to element 130 on line 128. Elements 130 and 136 are connected to code converter elements 140 and 142 respectively which convert the counts of elements 130 and 136 from a binary coded decimal count to a 7-segment display code. This code is applied through resistor networks 144 and 146, respectively, to 7-segment display elements 148 and 150, respectively. These 7-segment display elements may be Texas Instruments Opto-electronics components TIL 302, element 148 displaying the least significant bit and element 150 displaying the most significant bit. These displays are the displays viewed through window 12 of the event monitor.

When the displayed count has reached "0" in both the most significant and least significant bits, the next pulse produced on line 128 will cause element 136 to signal a "borrow" condition on line 152. This signal is applied to lock counter-elements 120, 122, 124, and 126 in their present condition, preventing any further pulses on line 128 and holding the system in this "0" condition. This signal also is applied to energize light 14 of the event monitor, which may be a light-emitting diode 154.

While an event monitor for a single court has been illustrated and described, it will be obvious that a multiplicity of adjacent courts all may be provided with event monitors as shown in FIG. 7. Then event monitors 170 may be located at each court, as illustrated, or in a central location such as at the pro shop 172. Additional displays 12 and light 14 may be provided at other locations, as desired, to for example signal to both the players at the court and to others at the "pro" shop over monitor 174 the period of play remaining for those on the court. Also, instead of or in addition to the light 14 the display 12 could be made to flash or blink if the court were open and available for use by players. Also, while a display has been shown on only one side of the monitor in FIGS. 1 and 2, of course another display could be provided on the opposite side to present to the players on the court the amount of time left to them as shown in FIG. 7.

Preferably the event monitor includes a system for mutilating each card placed in slot 16. This system, for example, may consist of a chopper 160 (FIG. 4) located downstream of the photoelectric sensor 32 and actuated by the reset signal for a period of time sufficient to cut the card into small pieces.

Different cards may be provided to actuate the system if desired, one card actuating it for one period, another for a different period and also actuating other, auxilliary systems such as lights 6. To achieve this, one or more additional start command elements 96 may be provided which are connected to the count latch elements by a matrix wired for another, different binary condition, such as a binary "one." If the light are actuated by one type of card, upon expiration of the period of play, the lights may be de-energized by the signal on line 152, for example. Rather than using different cards, different codes could be provided in different areas on one card and, by proper orientation, employed to actuate different systems or periods as desired. Also, instead of opaque areas in a transparent card, transparent areas (e.g., holes) could be provided in an opaque card.

While a photoelectric sensor system has been described, one which employs a card bearing transparent and opaque areas, of course other, different sensor systems could be used. For example, a magnetic sensor system could be employed, sensors 32 then being replaced by an inductive sensor system such as one or more coils, these coils sensing a variable reluctance condition imparted to the card, for example, by a conductive foil pre-stamped with the pattern required to actuate the system. This foil could be laminated between two sheets of paper to conceal its pattern. For such a system it would be desirable to drive the card past the sensor at a predetermined rate, which drive could be provided by the mutilating system 160, for example. Such a system also would prevent extended battery operation of the monitor, reducing (if liquid crystal display also were employed) the power drain from about 250 milliamps to one the order of 15 to 20 milliamps.

While a preferred embodiment of the event monitor has been described, and a specific circuit has been disclosed, it will be apparent to those skilled in this art that other constructions of the event monitor may be employed, and other, equivalent circuits may be used. Accordingly, the scope of the invention should not be limited by the preferred embodiment but rather is defined by the following claims.

We claim:

1. A method of monitoring and controlling a predetermined period of play for a game employing a court area and a card actuated counter, the method including the steps of:

requiring players entering the court area to actuate the counter to a predetermined period of play by employing a card, the counter then counting the elapsed period of play following its actuation by a card, the counter being positioned in an area external to the count and accessible to players waiting to play;

mutilating the card immediately upon its use to actuate the counter to prevent its repeated use;

displaying both to players using the count area and to other players waiting to use the court area the period of play still remaining in the predetermined period; and signaling the expiration of the predetermined period of play to other players whereupon they may actuate the counter and commence use of the court area.

2. A method as set forth in claim 1 in which there are a multiplicity of courts, each court having an associated counter, and signalling the period of play remaining at a location central to all courts.

3. A system for monitoring a predetermined period of play for a game employing a count area including:
   a counter for displaying a predetermined period of play, the counter being mounted external to the court area and in an area accessible to the players waiting to play;
   means including a card for actuating the counter;
   means upon actuation of the counter for causing the counter to count the elapsed period of play and to display the period of play still remaining in the predetermined period of play both to players using the count area and to players waiting to play;
   the counter including means for destroying the usefulness of the card upon its use to actuate the counter, thereby preventing its repeated use; and
   means signaling the expiration of the predetermined period of play to other players whereupon they may actuate the counter and commence their use of the court area.

4. A monitoring system as set forth in claim 3 in which there are a multiplicity of courts, each court having an associated monitor system, each counter of the system also signalling the period of play at a location central to all courts.

5. A monitor system as set forth in claim 3 in which the actuating card bears a pre-determined code, the actuating means including means for reading the code on the card, means comparing the read code to a pre-determined code, and means actuating the counter only when the read and pre-determined codes coincide.

6. A monitor system as set forth in claim 5 in which the predetermined code is arranged on the card symmetrically about the center point of the card, the actuating means actuating the counter regardless of the orientation of the card upon its use to actuate the counter.

7. A system for monitoring a predetermined period of play for a game employing a court area including:
   a counter;
   means actuating the counter only in response to a card bearing a predetermined code, the system thereby being operable by players desiring to use the court for a predetermined period of play and having a card with the requisite code for that period of play;
   the actuating means including sensor means for reducing the code of the supplied card and for generating a multiplicity of simultaneous series of electric pulses as the card is employed to actuate the counter, code counter means to advance the count upon each occurrence of a predetermined coincidence between corresponding pulses of the series, a plurality of bi-stable circuits, means to load the bi-stable circuits with a count of the code counter upon a predetermined coincidence of corresponding pulses of the series, and means to read the condition of the loaded bi-stable circuits and to actuate the counter only wnen the bi-stable circuits have been loaded with a predetermined count;
   means upon actuation of the counter for counting the elapsed period of play and displaying to other players waiting to use the court the period of play still remaining on the predetermined period; and
   means signaling the expiration of the predetermined period of play to other players whereupon they may actuate the counter with a card bearing a predetermined code and commence the use of the court.

8. A monitor system as set forth in claim 7 including means to produce strobe pulses upon occurrence of a pre-determined coincidence of corresponding pulses of the series, and means to detect the count of the code counter upon occurrence of a strobe pulse and to disable the reading means if the count of the code counter exceeds a pre-determined count.

9. A monitor system as se forth in claim 8 in which two simultaneous series of electric pulses are generated by the card.

10. A monitor system as set forth in claim 8 including means to destroy the usefulness of the card upon its passage through the monitor system regardless of whether or not the counter has been actuated.

11. A monitor system as set forth in claim 8 in which there are a multiplicity of pre-determined codes, one code actuating just the counter, at least one other code actuating both the counter and an external circuit.

12. A monitor system as set forth in claim 8 in which the card bears printed and non-printed areas, these are being sensed by the sensor means, the sensor means including photo-electric sensor elements for viewing the printed and non-printed areas of the card.

* * * * *